United States Patent
Robinett et al.

(10) Patent No.: US 12,450,330 B2
(45) Date of Patent: Oct. 21, 2025

(54) TECHNIQUES FOR CONTAINER REGISTRY CREDENTIALS MANAGEMENT

(71) Applicant: Ally Financial Inc., Detroit, MI (US)

(72) Inventors: Aaron Robinett, Charlotte, NC (US); Shalu Goel, Charlotte, NC (US); Aric Renzo, Huntersville, NC (US); Daniel Foley, Flagstaff, AZ (US); Joel Saju, Charlotte, NC (US); Julian Amrine, Charlotte, NC (US); Muktha Srinivasaiah, Charlotte, MI (US)

(73) Assignee: Ally Financial Inc., Detroit, MI (US)

( * ) Notice: Subject to any disclaimer, the term of this patent is extended or adjusted under 35 U.S.C. 154(b) by 178 days.

(21) Appl. No.: 18/449,272

(22) Filed: Aug. 14, 2023

(65) Prior Publication Data

US 2025/0061185 A1 Feb. 20, 2025

(51) Int. Cl.
*G06F 21/45* (2013.01)
*G06F 16/22* (2019.01)
*G06F 21/00* (2013.01)

(52) U.S. Cl.
CPC .......... *G06F 21/45* (2013.01); *G06F 16/2291* (2019.01)

(58) Field of Classification Search
CPC ...... G06F 16/2291; G06F 21/45; G06F 21/30; G06F 21/31; G06F 21/33; G06F 21/35; G06F 21/44; G06F 21/604; G06F 21/629
See application file for complete search history.

(56) References Cited

U.S. PATENT DOCUMENTS

2019/0058707 A1* 2/2019 Chung .................. H04L 63/102

* cited by examiner

*Primary Examiner* — Edward Zee
(74) *Attorney, Agent, or Firm* — Holland & Hart LLP (57) ABSTRACT

Methods, systems, and devices to support techniques for container registry credentials management are described. An operator executed across a set of clusters may manage credentials for multiple namespaces distributed across multiple clusters. For example, the operator may identify a configuration of a namespace (e.g., detect a creation of a configuration, detect an update to a configuration) and may provision the namespace within the container image registry using an application programming interface (API) call transmitted to the registry. The operator may retrieve one or more credentials associated with the namespace from the container image registry based on an operational mode (e.g., an application mode, an infrastructure mode). The operator may store the one or more credentials to a database associated with the cluster.

20 Claims, 6 Drawing Sheets

TECHNIQUES FOR CONTAINER REGISTRY CREDENTIALS MANAGEMENT

FIELD OF TECHNOLOGY

The present disclosure relates generally to distributed systems and data processing, and more specifically to techniques for container registry credentials management.

BACKGROUND

An organization may include multiple teams of developers that develop applications (e.g., computing applications related to financial institutions, user connectivity, user engagement, or the like) that use a containerized architecture. Such architectures may support a software deployment process that groups code associated with an application with resources, such as files, libraries, or the like, used to execute the application on multiple infrastructures. Using a containerized architecture may improve efficiency and security of application development. In some examples, an organization may employ a container image registry that stores various container images used to execute containers within a computing cluster. However, securely managing access credentials used to access the container image registry may be challenging.

SUMMARY

The described techniques relate to improved methods, systems, devices, and apparatuses that support techniques for container registry credentials management. Generally, the described techniques provide for an operator (e.g., a provisioner operator) that enables automated and efficient management of credentials. For example, the operator may identify a configuration of a namespace and provision the namespace within a container image registry using an application programming interface (API) call transmitted to the registry. The operator may retrieve one or more credentials associated with the namespace from the container image registry based on an operational mode. For example, under a first operational mode (e.g., an application mode), the operator may retrieve one or more credentials that authorize the namespace to retrieve container images from the registry but do not authorize the namespace to modify or add container images to the registry. Alternatively, under a second operational mode (e.g., an infrastructure mode), the operator may retrieve one or more credentials that authorize the namespace to retrieve container images from the registry and may retrieve one or more credentials that authorize the namespace to modify and add container images to the registry. The operator may store the one or more credentials to a database associated with the cluster.

A method by an apparatus is described. The method may include identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provisioning the namespace within the registry based at least in part on an API call transmitted to the registry by the operator in accordance with the configuration, retrieving, by the operator, one or more credentials associated with the namespace from the registry based at least in part on an operational mode of a plurality of operational modes of the operator, and storing the one or more credentials to a database associated with the cluster of the plurality of clusters.

An apparatus is described. The apparatus may include one or more memories storing processor executable code, and one or more processors coupled with the one or more memories. The one or more processors may individually or collectively operable to execute the code to cause the apparatus to identify, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provision the namespace within the registry based at least in part on an API call transmitted to the registry by the operator in accordance with the configuration, retrieve, by the operator, one or more credentials associated with the namespace from the registry based at least in part on an operational mode of a plurality of operational modes of the operator, and store the one or more credentials to a database associated with the cluster of the plurality of clusters.

Another apparatus is described. The apparatus may include means for identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, means for provisioning the namespace within the registry based at least in part on an API call transmitted to the registry by the operator in accordance with the configuration, means for retrieving, by the operator, one or more credentials associated with the namespace from the registry based at least in part on an operational mode of a plurality of operational modes of the operator, and means for storing the one or more credentials to a database associated with the cluster of the plurality of clusters.

A non-transitory computer-readable medium storing code is described. The code may include instructions executable by a processor to identify, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provision the namespace within the registry based at least in part on an API call transmitted to the registry by the operator in accordance with the configuration, retrieve, by the operator, one or more credentials associated with the namespace from the registry based at least in part on an operational mode of a plurality of operational modes of the operator, and store the one or more credentials to a database associated with the cluster of the plurality of clusters.

Some examples of the method, apparatus, and non-transitory computer-readable medium described herein may further include operations, features, means, or instructions for determining that the operational mode corresponds to an infrastructure mode and configuring, as part of provisioning the namespace, the one or more credentials to authorize the namespace to modify a container image of the one or more container images of the registry.

Some examples of the method, apparatus, and non-transitory computer-readable medium described herein may further include operations, features, means, or instructions for determining that the operational mode corresponds to an application mode and configuring, as part of provisioning the namespace, the one or more credentials to authorize the namespace to access a container image of the one or more container images of the registry.

Some examples of the method, apparatus, and non-transitory computer-readable medium described herein may further include operations, features, means, or instructions for determining, by the operator, that the namespace may have not been provisioned within the registry, wherein provisioning the namespace may be based at least in part on the determining.

Some examples of the method, apparatus, and non-transitory computer-readable medium described herein may further include operations, features, means, or instructions for detecting a change in the configuration, wherein identifying the configuration may be based at least in part on detecting the change.

In some examples of the method, apparatus, and non-transitory computer-readable medium described herein, the change in the configuration comprises a creation of the configuration, an update of the configuration, or a deletion of the configuration.

Some examples of the method, apparatus, and non-transitory computer-readable medium described herein may further include operations, features, means, or instructions for executing an initialization procedure of the operator, wherein identifying the configuration may be part of the initialization procedure.

In some examples of the method, apparatus, and non-transitory computer-readable medium described herein, provisioning the namespace may include operations, features, means, or instructions for provisioning one or more robot accounts corresponding to the namespace based at least in part on the configuration.

Some examples of the method, apparatus, and non-transitory computer-readable medium described herein may further include operations, features, means, or instructions for storing the configuration in a distributed key-value database associated with the plurality of clusters.

In some examples of the method, apparatus, and non-transitory computer-readable medium described herein, the configuration comprises an indication of one or more permissions for one or more users associated with the namespace and an indication of one or more accounts associated with the namespace.

Some examples of the method, apparatus, and non-transitory computer-readable medium described herein may further include operations, features, means, or instructions for determining that the one or more credentials do not match one or more second credentials associated with the namespace and stored within the database, wherein storing the one or more credentials may be based at least in part on the determining.

In some examples of the method, apparatus, and non-transitory computer-readable medium described herein, the configuration comprises a custom organization map associated with the namespace.

In some examples of the method, apparatus, and non-transitory computer-readable medium described herein, the operational mode corresponds to an environmental variable of the operator.

A method by an apparatus is described. The method may include identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provision the namespace within the registry based at least in part on an API call transmitted to the registry by the operator in accordance with the configuration, retrieve, by the operator, one or more credentials associating with the namespace from the registry based at least in part on an operational mode of a plurality of operational modes of the operator, and storing the one or more credentials to a database associated with the cluster of the plurality of clusters.

An apparatus is described. The apparatus may include one or more memories storing processor executable code, and one or more processors coupled with the one or more memories. The one or more processors may individually or collectively operable to execute the code to cause the apparatus to identify, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provision the namespace within the registry based at least in part on an API call transmitted to the registry by the operator in accordance with the configuration, retrieve, by the operator, one or more credentials associated with the namespace from the registry based at least in part on an operational mode of a plurality of operational modes of the operator, and store the one or more credentials to a database associated with the cluster of the plurality of clusters.

Another apparatus is described. The apparatus may include means for identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, means for provision the namespace within the registry based at least in part on an API call transmitted to the registry by the operator in accordance with the configuration, means for retrieve, by the operator, one or more credentials associating with the namespace from the registry based at least in part on an operational mode of a plurality of operational modes of the operator, and means for storing the one or more credentials to a database associated with the cluster of the plurality of clusters.

A non-transitory computer-readable medium storing code is described. The code may include instructions executable by a processor to identify, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provision the namespace within the registry based at least in part on an API call transmitted to the registry by the operator in accordance with the configuration, retrieve, by the operator, one or more credentials associated with the namespace from the registry based at least in part on an operational mode of a plurality of operational modes of the operator, and store the one or more credentials to a database associated with the cluster of the plurality of clusters.

Some examples of the method, apparatus, and non-transitory computer-readable medium described herein may further include operations, features, means, or instructions for determining that the operational mode corresponds to an infrastructure mode and configuring, as part of provision the namespace, the one or more credentials to authorize the namespace to modify a container image of the one or more container images of the registry.

Some examples of the method, apparatus, and non-transitory computer-readable medium described herein may further include operations, features, means, or instructions for determining that the operational mode corresponds to an application mode and configuring, as part of provision the namespace, the one or more credentials to authorize the namespace to access a container image of the one or more container images of the registry.

Some examples of the method, apparatus, and non-transitory computer-readable medium described herein may further include operations, features, means, or instructions for determining, by the operator, that the namespace may have not been provisioned within the registry, wherein provisioning the namespace may be based at least in part on the determining.

Some examples of the method, apparatus, and non-transitory computer-readable medium described herein may further include operations, features, means, or instructions for detecting a change in the configuration, wherein identifying the configuration may be based at least in part on detecting the change.

In some examples of the method, apparatus, and non-transitory computer-readable medium described herein, the change in the configuration comprises a creation of the configuration, an update of the configuration, or a deletion of the configuration.

DETAILED DESCRIPTION

In some cases, an organization (e.g., a company, a corporation, a financial institution, or the like) may employ a containerized computing architecture to support development and deployment of applications. For example, the containerized architecture may include a set of computing clusters, with each cluster including one or more nodes that may execute applications within containers. To support container management, the set of clusters may be in communication with a container image registry, which may store files, such as a set of container images, configured to generate or execute containers within a cluster. In some examples, a user or group of users of a cluster (e.g., one or more developers associated with the corporation) may develop or deploy (or both) applications within containers executed in the set of clusters. As part of application development and deployment, a user may retrieve images (e.g., container images) from and, in some cases, modify or add images to the container image registry using one or more credentials, such as access tokens. However, managing credentials for multiple namespaces across multiple clusters may increase security risks, reduce efficiency of application development, or both. For example, providing access credentials to each user associated with application development may increase the likelihood of human-error in managing the access credentials, and may expose the credentials to malicious actors, thus posing a security threat.

As described herein, an operator executed across the set of clusters may manage credentials for multiple namespaces distributed across multiple clusters to access a container image registry. For example, the operator may identify a configuration of a namespace (e.g., may detect a creation of the configuration, may detect an update if the configuration) and may provision the namespace within the container image registry using an API call transmitted to the registry. The operator may retrieve one or more credentials associated with the namespace from the container image registry based on an operational mode. For example, if the operator identifies an application mode, the operator may retrieve one or more credentials that authorize the namespace to retrieve container images from the registry but do not authorize the namespace to modify or add container images to the registry. Alternatively, if the operator identifies an infrastructure mode, the operator may retrieve one or more credentials that authorize the namespace to retrieve container images from the registry and may retrieve one or more credentials that authorize the namespace to modify and add container images to the registry. The operator may store the one or more credentials to a database associated with the cluster. Using the operator to manage namespaces may improve security of the system, for example by mitigating human interaction with the one or more credentials, which may introduce an increased likelihood of user error, opportunity for malicious attacks, or both. Additionally, using the operator (e.g., in an automated way) may increase the speed and accuracy of provisioning a namespace, which may decrease costs associated with the system and improve user experience.

Aspects of the disclosure are initially described in the context of systems and a process flow. Aspects of the disclosure are further illustrated by and described with reference to system diagrams and flowcharts that relate to techniques for container registry credentials management.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 1:
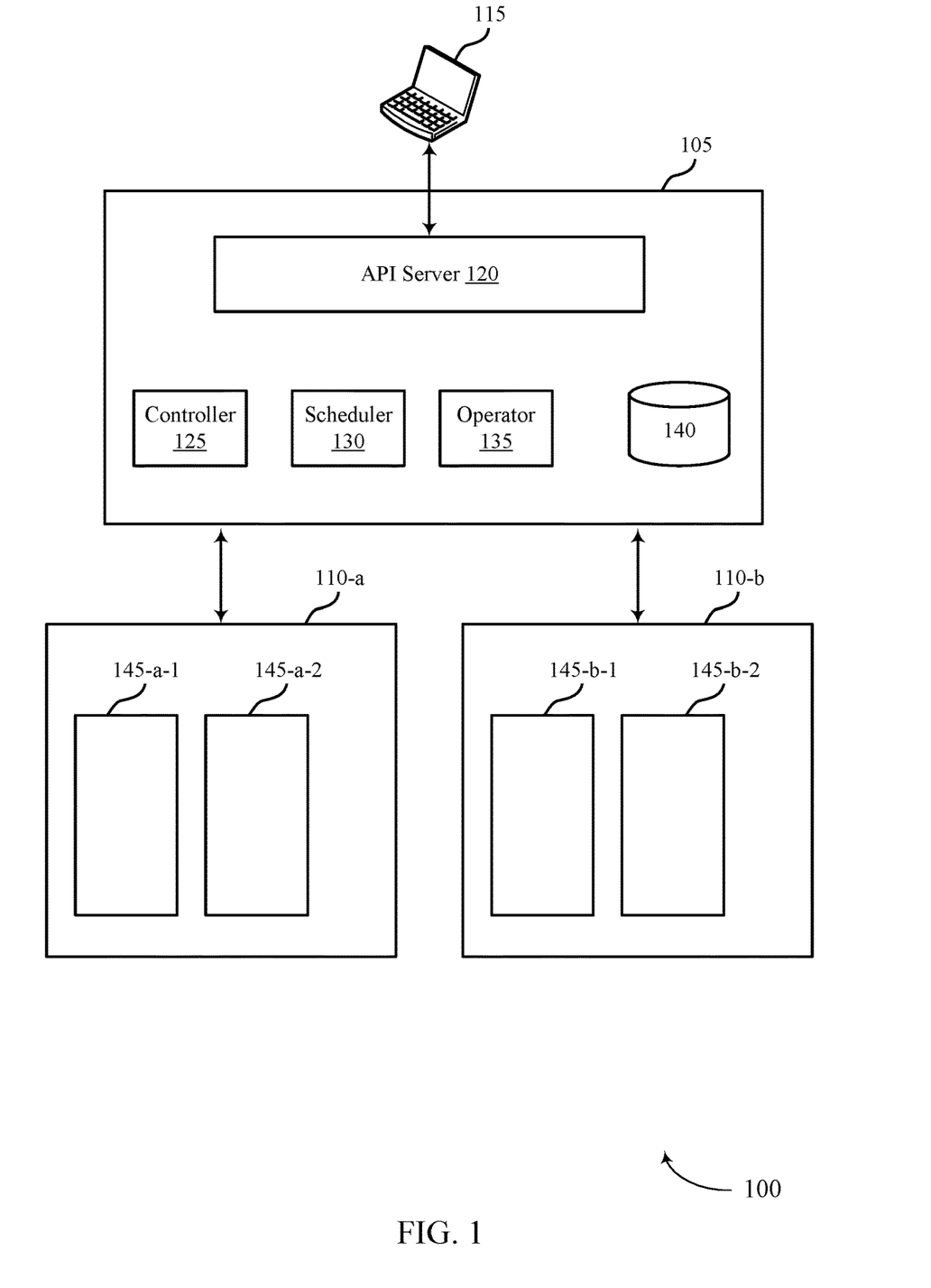
FIG. 1 shows an example of a system that supports techniques for container registry credentials management in accordance with aspects of the present disclosure.

FIG. 1 shows an example of a system 100 that supports techniques for container registry credentials management in accordance with aspects of the present disclosure. The system 100 may illustrate a containerized architecture and may be an example of a cluster (e.g., a computing cluster) configured to execute one or more containers 145 (e.g., a container 145-*a*-1, a container 145-*a*-2, a container 145-*b*-1, a container 145-*b*-2) across one or more nodes. The system 100 may be executed across one or more computing systems, including one or more physical computing machines (e.g., on-premises computers), one or more cloud-based environments, one or more virtual machine environments, or a combination thereof. The one or more computing systems may employ various operating systems and may support execution of the containers 145 within each of the various operating systems.

The system 100 may include a node 105, which may orchestrate and manage operations across the system 100. For example, the node 105 may manage the state of the cluster, and may assign tasks, such as executing containers 145, to one or more nodes 110. A node 110 may be an example of a worker node and may provide computing resources for executing applications within one or more containers 145. For example, the node 110-*a* may include resources for executing applications within the container 145-*a*-1 and the container 145-*a*-2, and the node 110-*b* may include resources for executing applications within the container 145-*b*-1 and the container 145-*b*-2.

In some cases, the node 105 may include a controller 125 and a scheduler 130, which may support in scheduling resources and assigning tasks across the system 100. Additionally, resources of the system 100 (e.g., computing resources, storage resources, communications resources) may be organized into one or more namespaces of the system 100. For example, multiple users or groups of users may interact with the system 100 using respective namespaces, which may support different groups of users in building and deploying applications using the system 100.

A namespace may refer to a set of signs (e.g., a set of names) used for identifying and referring to respective objects, where each object may have a unique name that is used for identification. In some examples, namespaces within the system 100 may be configured according to an operational mode associated with various credentials or authorizations (e.g., various permissions) associated with a container image registry. For example, a first namespace may be configured in accordance with an infrastructure mode, and the system 100 may provide or provision a set of credentials to the first namespace that allow the first namespace to both retrieve container images from the container image registry and modify or add container images to the container image registry. Additionally, or alternatively, a second namespace may be configured in accordance with an application mode, and the system 100 may provide or provision a set of credentials to the second namespace that allow the second namespace to both retrieve container images from the container image registry but may not allow the second namespace to modify or add container images to the container image registry.

The system 100 may store the sets of credentials for the namespaces associated with the system 100 within a database 140, such as a distributed key-value database (e.g., an ETCD database). The database 140 may provide reliable and secure data stored for the system 100, and may store configuration data, status, metadata, credential information, or combination thereof for the system 100, among other examples.

Additionally, the node 105 may include an API server 120, which may support communications with a device 115 using an API. For example, the API server 120 may receive commands or messages from the device 115 (e.g., via an API call) and may transmit communications to the device 115 (e.g., as a response to the API call). Accordingly, a user may, using the device 115 and the API server 120, manage operations of the system 100, such as by instructing the node 105 to obtain container images (e.g., from the container image registry) to execute across the system 100, the add container images to the container image registry, or both.

In some examples, an operator 135 executed across the set of clusters may manage credentials for multiple namespaces distributed across multiple clusters to access a container image registry. As described herein, an operator 135 may be a method of packaging, deploying, and managing an application within a containerized architecture. For example, an operator 135 may be an application-specific controller that employs an API to create, configure, and manage instances of applications on behalf of a user. An operator 135 may implement control loops that compare a desired state of a cluster to an actual state of the cluster and may perform one or more actions to match the actual state with the desired state. In some examples, an operator 135 may use one or more custom resources to manage applications and components thereof.

For example, the operator 135 may identify a configuration of a namespace (e.g., may detect a creation of the configuration, may detect an update of the configuration) and may provision the namespace within the container image registry using an API call transmitted to the registry via the API server 120. The operator 135 may retrieve one or more credentials associated with the namespace from the container image registry based on an operational mode. For example, if the operator 135 identifies an application mode, the operator 135 may retrieve one or more credentials that authorize the namespace to retrieve container images from the registry but do not authorize the namespace to modify or add container images to the registry. Alternatively, if the operator 135 identifies an infrastructure mode, the operator 135 may retrieve one or more credentials that authorize the namespace to retrieve container images from the registry and may retrieve one or more credentials that authorize the namespace to modify and add container images to the registry. The operator 135 may store the one or more credentials to a database 140 associated with the cluster.

Using the operator 135 to manage namespaces may improve security of the system, for example by mitigating human interaction with the one or more credentials, which may introduce an increased likelihood of user error, opportunity for malicious attacks, or both. Additionally, using the operator 135 may increase the speed and accuracy of provisioning a namespace, which may decrease costs associated with the system and improve user experience. In particular, the operator 135 may be used to automate initial provisioning of organization credentials of a container registry platform, initial provisioning of credentials for accounts (e.g., robot accounts) used to set up automated access to repositories of the container registry platform, among other examples. Such functions may be performed when a new namespace or project is initially onboarded onto the container registry platform. Further, the operator 135 may be used with the credentials for accounts used to set up automated access to repositories when rotating or regenerating such credentials. As such, the operator 135 may be associated with functionality that enables a degree of automation to processes associated with adding new software applications into container orchestration platforms.

Figure 2:
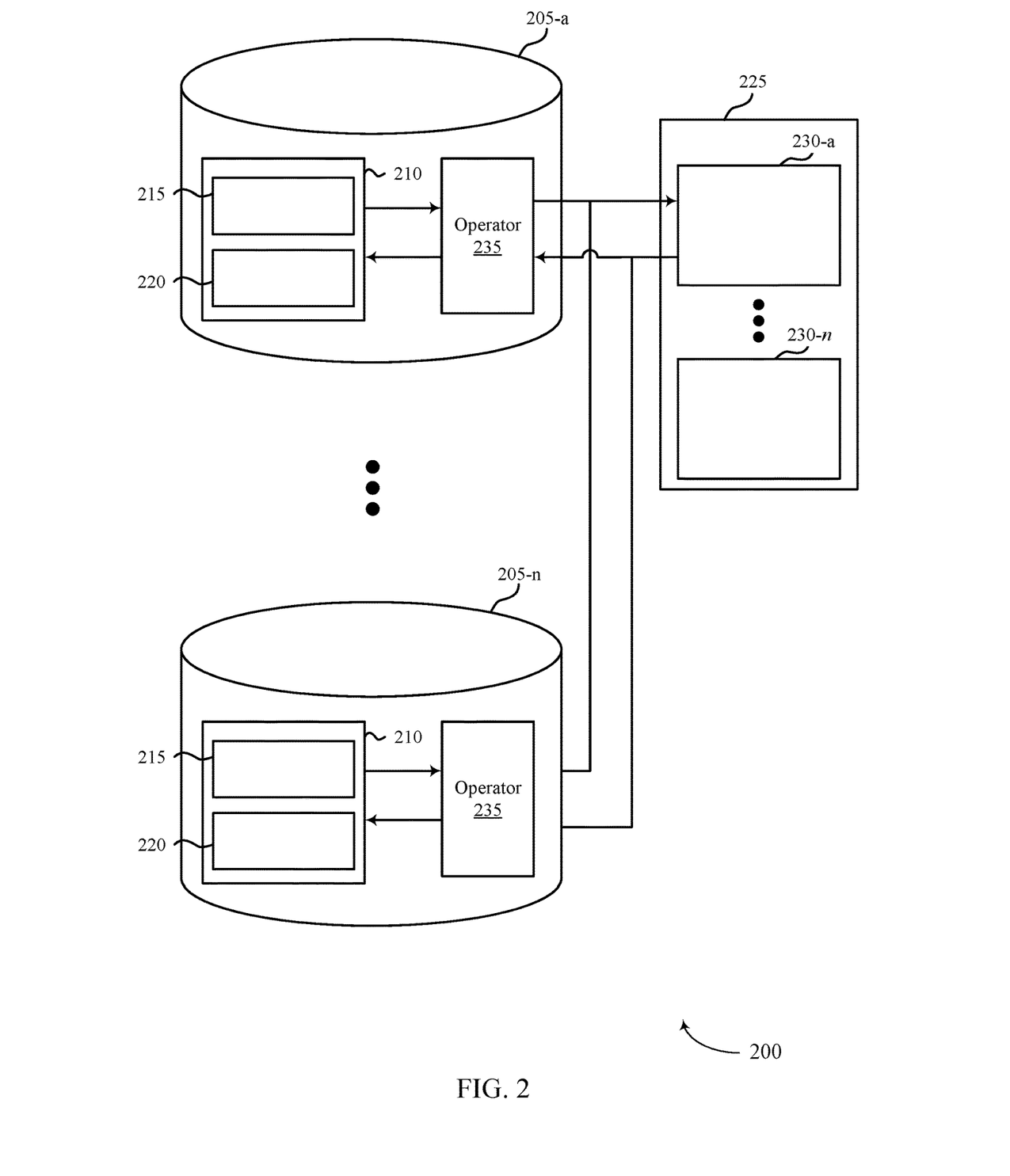
FIG. 2 shows an example of a system that supports techniques for container registry credentials management in accordance with aspects of the present disclosure.

FIG. 2 shows an example of a system 200 that supports techniques for container registry credentials management in accordance with aspects of the present disclosure. The system 200 may include multiple clusters 205, which may each be an example of or include aspects of the cluster included in the system 100 as described with reference to FIG. 1. For example, the system 200 may include cluster 205-*a* through cluster 205-*n*, which may each implement an operator 235, which may be an example of the operator 135 of the system 100.

The system 200 may include multiple namespaces 210, which may each be associated with a single cluster 205 or may be common to multiple clusters 205. A namespace 210 may be employed by a user or a group of users to develop or deploy (or both) applications within containers executed in the set of clusters 205. As part of application development and deployment, a user may retrieve images (e.g., container images) from and, in some cases, modify or add images to a container image registry 225.

In some cases, to retrieve images from or add images to the container image registry 225, a user of namespace 210 may provide one or more credentials 220 to the container image registry 225. For example, the container image registry 225 may manage multiple organizations 230 (e.g., organization 230-*a* through organization 230-*n*), each organization 230 (e.g., an organization for which a container registry is associated) corresponding to a namespace 210 of the set of clusters 205. An organization 230 may manage multiple container images that belong to or are associated with the corresponding namespace 210, and may coordinate permissions (e.g., ability to push or pull images from the organization 230) for particular users associated with the namespace, as well as permissions that apply to the namespace 210 as a whole. Additionally, an organization 230 may manage one or more robot accounts associated with the namespace 210, which may provide automated access to the container image registry 225 for automated entities, such as pipeline tools and API tools, among other examples.

A namespace 210 of the system 200 may include or may be associated with a configuration 215, which may include an indication of one or more permissions for a set of users of the namespace 210. For example, the configuration 215 may indicate whether users of the namespace 210 are permitted to retrieve container images from the container image registry 225, may indicate whether users of the namespace 210 are permitted to modify or add container images from the container image registry 225, may indicate one or more robot accounts associated with the namespace 210, may indicate metadata associated with the namespace 210 (e.g., a name of the namespace 210, an environment of the namespace 210, an identifier of the namespace 210), or a combination thereof. In some cases, the configuration 215 may be an example of a custom resource (e.g., a custom organization map) for the operator 235.

In some cases, a user may define or generate a configuration 215 using one or more file formats, such as a JavaScript Object Notation (JSON) format, a HyperText Markup Language (HTML) format, an extensible markup language (XML) format, or the like. The system 200 may manage a configuration 215 using a version control software, and may securely store the configuration 215, such as within a database 140 as described with reference to FIG. 1. Additionally, or alternatively, the system 200 may store the configuration 215 using a version control software.

The operator 235 may monitor and manage one or more credentials 220 within the namespace 210, as well as the corresponding organization 230 within the container image registry 225. For example, a cluster 205 may support event monitoring for the operator, and the operator 235 may thus monitor for events related to a configuration 215 of the namespace 210, such as a creation of the configuration 215, an update or modification of the configuration 215, a deletion of the configuration 215, or a combination thereof (e.g., created, updated or deleted (CRUD) operations). In response to detecting an event associated with the configuration 215, the operator 235 may interface with the container image registry 225, for example using one or more API calls, to coordinate the namespace 210 with a corresponding organization 230.

For example, the operator 235 may determine whether an organization 230 corresponding to the namespace 210 exists within the container image registry 225. If a corresponding organization 230 does not exist, the operator 235 may provision (e.g., create) the organization 230 according to the configuration 215 (e.g., according to the defined set of permissions indicated in the configuration 215), and may retrieve one or more credentials 220 that support the defined permissions from the container image registry 225. The operator 235 may provide the one or credentials 220 to the cluster 205, which may securely store the one or more credentials 220 (e.g., within the database 140). In some examples, to retrieve the one or more credentials 220, the operator 235 may obtain a set of registry credentials (e.g., one or more secrets) associated with the organization 230 from the container image registry 225, and may use the set of registry credentials to generate the one or more credentials 220, which may be examples of a set of tokens for the container image registry 225.

Alternatively, if the organization corresponding to the namespace 210 does exist within the container image registry 225, the operator 235 may retrieve the one or more credentials 220 from the container image registry and update the stored one or more credentials 220 within the cluster 205 (e.g., may match the stored one or more credentials 220 with the one or more credentials 220 within the container image registry 225. In some examples, the one or more credentials 220 may be an example of an encrypted (e.g., secret) resource. Thus, to support security of the one or more credentials 220, the operator 235 may not store the one or more credentials 220 within non-volatile (e.g., persistent) memory during processing of the configuration 215. Instead, the operator 235 may temporarily store the one or more credentials 220 within a volatile memory during processing and may then store the one or more credentials 220 to a secure database (e.g., the database 140). In some examples, a namespace 210 may be common to multiple clusters 205. In such examples, because the operator 235 may retrieve the one or more credentials 220 from the container image registry 225, the operator 235 may support synchronization of the one or more credentials 220 across the multiple clusters.

The operator 235 may generate accounts (e.g., robot accounts) with credentials (e.g., privileges) in accordance with the configuration 215. In some cases, the credentials may be dynamically copied from the container image registry 225 to the set of clusters 205 as an encrypted (e.g., secret) resource. In response to detecting an event associated with the configuration 215, the operator 235 may match credentials stored in the set of clusters 205 with the credentials in container image registry 225.

In some cases, the one or more credentials 220 provisioned by the operator 235 may depend on a type or operational mode of the operator 235. In such cases, the operational mode of the operator 235 may be an example of or may be indicated by an environmental variable of the operator 235. For example, if the operator 235 is running in an application cluster mode, the operator 235 may provision a first type of the one or more credentials 220 to the namespace 210, which may enable the namespace 210 to retrieve container images from the container image registry 225 but may not enable the namespace to modify or add container images to the container image registry 225. Additionally, or alternatively, if the operator 235 is running in an infrastructure cluster or operational cluster mode, the operator 235 may provision a second type of the one or more credentials 220 to the namespace 210, which may enable the namespace 210 to add or modify (e.g., push) container images to the container image registry 225, as well as enable the namespace 210 to retrieve container images from the container image registry 225. To manage a system which does not include the operator 235, a developer (e.g., a platform engineer) may manually ensure that privileged users or teams may access a namespace 210, which may introduce security risks and inefficient workflow. Accordingly, the operator 235 may support a separation of duties, which may improve security of the system 200.

Using the operator 235 to manage namespaces 210 and organizations 230 within the container image registry 225 may improve security of the system 200, for example by mitigating human interaction with the one or more credentials, which may introduce an increased likelihood of user error, opportunity for malicious attacks, or both. Additionally, using the operator 235 may increase the speed and accuracy of provisioning a namespace 210 and an organization 230, which may decrease costs associated with the system 200 and improve user experience.

Figure 3:
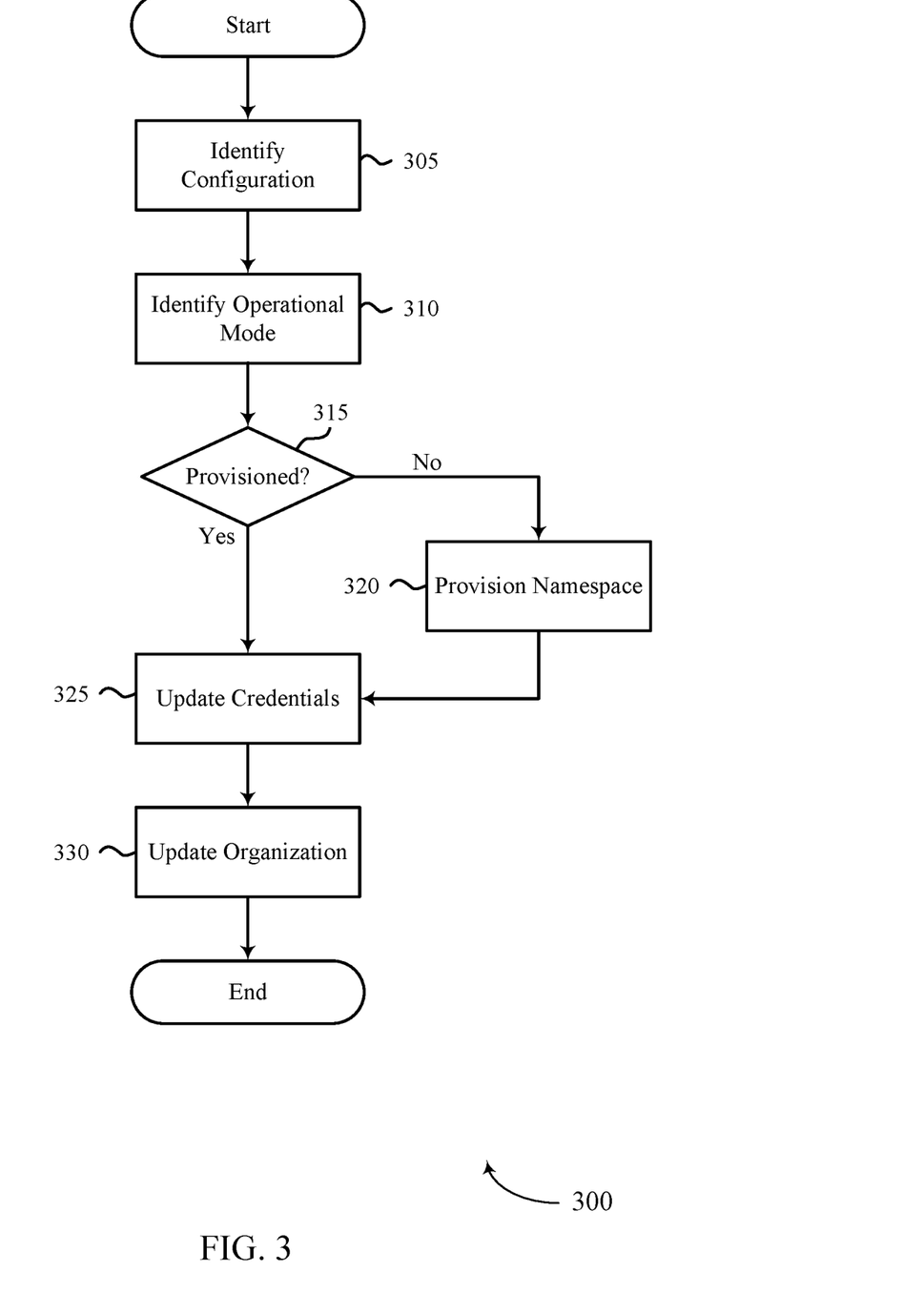
FIGS. 3 and 4 show examples of process flows that supports techniques for container registry credentials management in accordance with aspects of the present disclosure.

FIG. 3 shows an example of a process flow 300 that supports techniques for container registry credentials management in accordance with aspects of the present disclosure. The process flow 300 or aspects thereof may be implemented by an operator, such as the operator 135, the operator 235, or both. In the following description of the process flow 300, the operations may be performed in a different order than the order shown. For example, specific operations may also be left out of the process flow 300, or other operations may be added to process flow 300.

The process flow 300 may illustrate a method to manage namespaces associated with a set of clusters and corresponding organizations within a container image registry using a configuration, such as the configuration 215 as described with reference to FIG. 2. For example, at 305, the operator may identify a configuration of a namespace of a plurality of namespaces associated with the registry. In some cases, the operator may identify the configuration in response to detecting a change in the configuration, such as a creation of the configuration, an update of the configuration, or the deletion of a configuration. Additionally, or alternatively, the operator may identify the configuration as part of an initialization procedure of the operator. For example, the operator may iterate through and perform one or more steps of process flow 300 for each configuration associated with the set of clusters.

At 310, the operator may identify an operational mode. For example, the operator may check an environmental variable, which may indicate whether to operate in an infrastructure cluster mode or in an application cluster mode.

At 315, the operator may determine whether the namespace has been provisioned within the registry, for example using one or more API calls. If the namespace has not been provisioned, the operator may, at 320, provision the namespace within the registry using one or more API calls transmitted to the registry. In some examples, as part of provisioning the namespace, the operator may create one or more robot accounts for the namespace, in accordance with the configuration.

At 325, the operator may update or create one or more credentials based on the operational mode identified at 310. For example, if the operator identifies an application cluster mode, the operator may configure the one or more credentials to authorize the namespace to retrieve container images from the registry but may not configure the one or more credentials to authorize the namespace to modify or add container images to the registry. Alternatively, if the operator identifies an infrastructure cluster mode, the operator may configure the one or more credentials to authorize the namespace to retrieve container images from the registry and may configure the one or more credentials to authorize the namespace to modify and add container images to the registry.

In some examples, as part of updating the one or more credentials, the operator may retrieve the one or more credentials from the registry, and may store the one or more credentials to a database associated with the cluster.

At 330, the operator may update the organization within the registry in accordance with the configuration. For example, if the configuration is modified to include additional information, such as additional robot accounts, updated teams, updated permissions, or the like, the operator may configure the organization within the registry to reflect the updated information.

Figure 4:
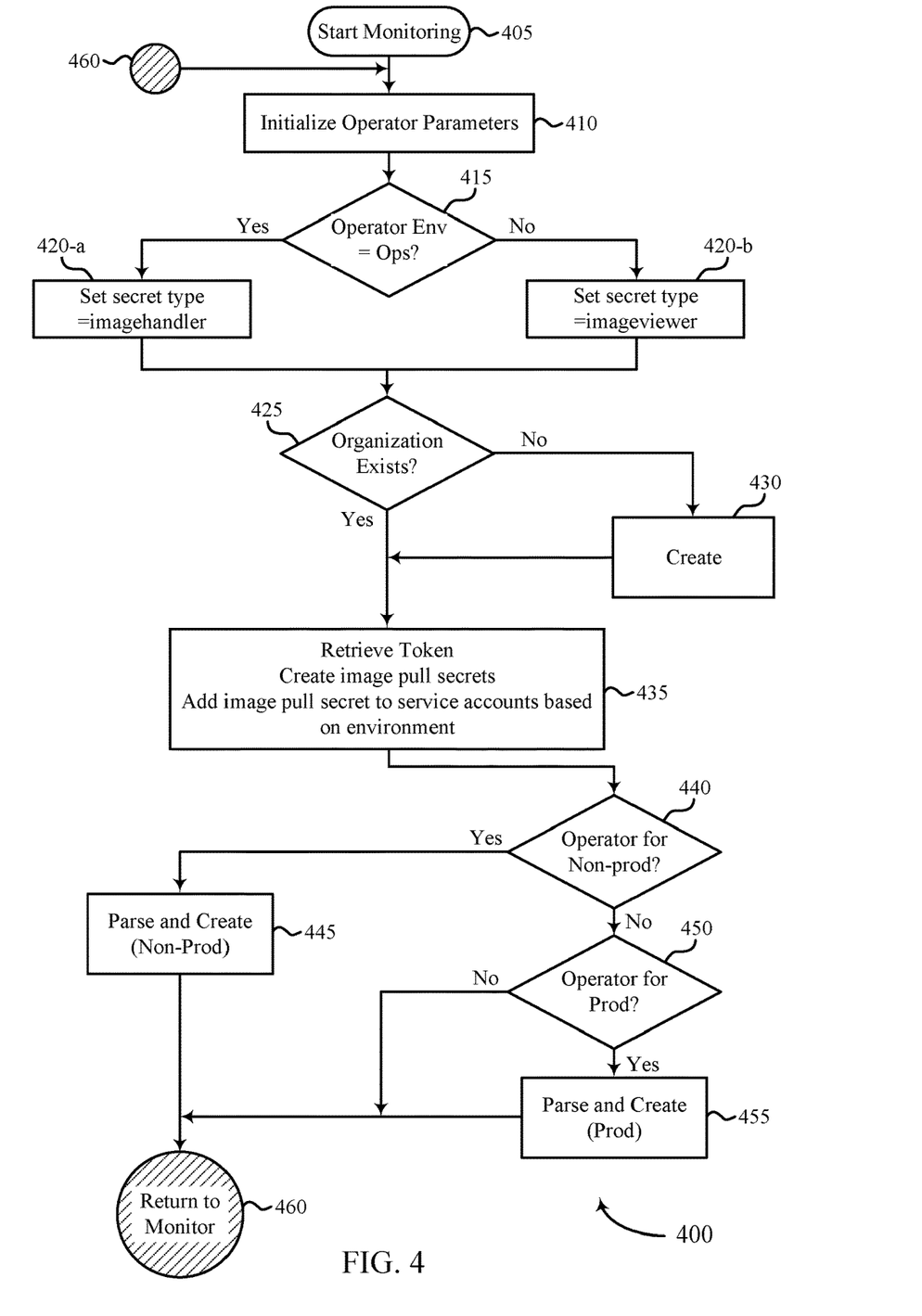

FIG. 4 shows an example of a process flow 400 that supports techniques for container registry credentials management in accordance with aspects of the present disclosure. The process flow 400 or aspects thereof may be implemented by an operator, such as the operator 135, the operator 235, or both. In the following description of the process flow 400, the operations may be performed in a different order than the order shown. For example, specific operations may also be left out of the process flow 400, or other operations may be added to process flow 400.

The process flow 400 may illustrate a method to manage namespaces associated with a set of clusters and corresponding organizations within a container image registry using a configuration, such as the configuration 215, as described with reference to FIG. 2. For example, at 405, the operator may begin monitoring for an event related to a namespace of a plurality of namespaces associated with the registry. For example, the operator may identify a configuration of the namespace in response to detecting a change in the configuration, such as a creation of the configuration, an update of the configuration, or the deletion of a configuration. Additionally, or alternatively, the operator may identify the configuration as part of an initialization procedure of the operator. For example, the operator may iterate through and perform one or more steps of process flow 400 for each configuration associated with the set of clusters. At 410, the operator may initialize one or more operator parameters, such as configuration files, environmental variables associated with the operator, or both.

At 415, the operator may identify an operational mode. For example, the operator may check an environmental variable, which may indicate whether to operate in an infrastructure cluster mode or in an application cluster mode. If the operator determines that the environmental variable is an operations (e.g., "ops") value, the operator may determine to operate in an infrastructure mode and may, at 420-*a*, set a value of a variable indicating a secret type to authorize the namespace to retrieve container images from the registry and may authorize the namespace to modify and add container images to the registry (e.g., an "imagehandler" value). Alternatively, if the operator determines that the environmental variable is not an operations value, the operator may determine to operate in an application mode and may, at 420-*b*, set a value of a variable indicating a secret type to authorize the namespace to retrieve container images from the registry and may not authorize the namespace to modify and add container images to the registry (e.g., an "imageviewer" value).

At 425, the operator may determine whether the namespace exists within the container image registry. For example, the operator may determine if the namespace has been provisioned within the registry, for example using one or more API calls. If the namespace has not been provisioned, the operator may, at 430, provision the namespace within the registry using one or more API calls transmitted to the registry. In some examples, as part of provisioning the namespace, the operator may create one or more robot accounts for the namespace, in accordance with the configuration.

At 435, the operator may update or create one or more credentials based on the operational mode identified at step 310. Updating the one or more credentials may include retrieving one or more credentials (e.g., tokens) from the container image registry. For example, if the operator identifies an application cluster mode, the operator may configure the one or more credentials to authorize the namespace to retrieve container images (e.g., may create one or more image pull secrets) from the registry but may not configure the one or more credentials to authorize the namespace to modify or add container images to the registry. Alternatively, if the operator identifies an infrastructure cluster mode, the operator may configure the one or more credentials to authorize the namespace to retrieve container images from the registry and may configure the one or more credentials to authorize the namespace to modify and add container images to the registry.

At 440, the operator may determine whether the operator is configured for a non-production cluster. If the operator is configured for the non-production cluster, at 445, the operator may parse the configuration and create the organization within the registry in accordance with the configuration and one or more non-production parameters. For example, if the configuration is modified to include additional information, such as additional robot accounts, updated teams, updated permissions, or the like, the operator may configure the organization within the registry to reflect the updated information.

Alternatively, if the operator is not configured for the non-production cluster, the operator may determine if the operator is configured for a production cluster at 450. If the operator is configured for a production cluster, at 455, the operator may parse the configuration and create the organization within the registry in accordance with the configuration and one or more production parameters. For example, if the configuration is modified to include additional information, such as additional robot accounts, updated teams, updated permissions, or the like, the operator may configure the organization within the registry to reflect the updated information.

At 460, the operator may monitor for an update to a second configuration. For example, the operator may iterate through and perform one or more steps of process flow 400 for each configuration associated with the set of clusters.

Figure 5:
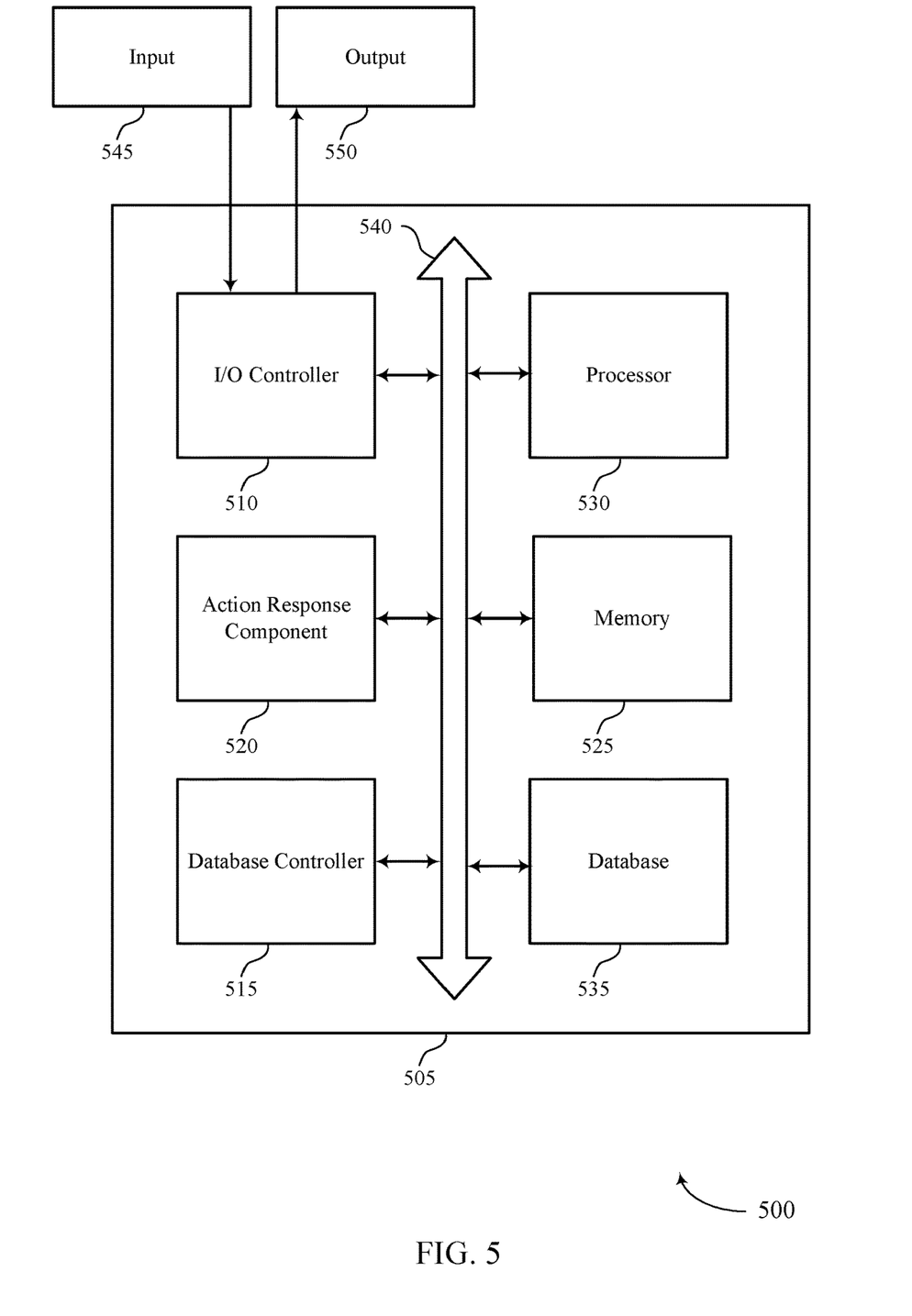
FIG. 5 shows a diagram of a system including a device that supports techniques for container registry credentials management in accordance with aspects of the present disclosure.

FIG. 5 shows a diagram of a system 500 including a device 505 that supports techniques for container registry credentials management in accordance with aspects of the present disclosure. The device 505 may include components for bi-directional voice and data communications including components for transmitting and receiving communications, such as. These components may be in electronic communication or otherwise coupled (e.g., operatively, communicatively, functionally, electronically, electrically) via one or more buses (e.g., a bus 540).

The I/O controller 510 may manage input signals 545 and output signals 550 for the device 505. The I/O controller 510 may also manage peripherals not integrated into the device 505. In some cases, the I/O controller 510 may represent a physical connection or port to an external peripheral. In some cases, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some cases, the I/O controller 510 may be implemented as part of a processor. In some examples, a user may interact with the device 505 via the I/O controller 510 or via hardware components controlled by the I/O controller 510.

The database controller 515 may manage data storage and processing in a database 535. The database 535 may be external to the device 505, temporarily or permanently connected to the device 505, or a data storage component of the device 505. In some cases, a user may interact with the database controller 515. In some other cases, the database controller 515 may operate automatically without user interaction. The database 535 may be an example of a persistent data store, a single database, a distributed database, multiple distributed databases, a database management system, or an emergency backup database.

Memory 525 may include random-access memory (RAM) and read-only memory (ROM). The memory 525 may store computer-readable, computer-executable software including instructions that, when executed, cause the processor to perform various functions described herein. In some cases, the memory 525 may contain, among other things, a basic input/output system (BIOS), which may control basic hardware or software operation such as the interaction with peripheral components or devices.

The processor 530 may include an intelligent hardware device (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 530 may be configured to operate a memory array using a memory controller. In some other cases, a memory controller may be integrated into the processor 530. The processor 530 may be configured to execute computer-readable instructions stored in memory 525 to perform various functions (e.g., functions or tasks supporting techniques for container registry credentials management).

For example, the action response component 520 may be configured as or otherwise support a means for identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters. The action response component 520 may be configured as or otherwise support a means for provisioning the namespace within the registry based at least in part on an API call transmitted to the registry by the operator in accordance with the configuration. The action response component 520 may be configured as or otherwise support a means for retrieving, by the operator, one or more credentials associated with the namespace from the registry based at least in part on an operational mode of a plurality of operational modes of the operator. The action response component 520 may be configured as or otherwise support a means for storing the one or more credentials to a database associated with the cluster of the plurality of clusters.

Figure 6:
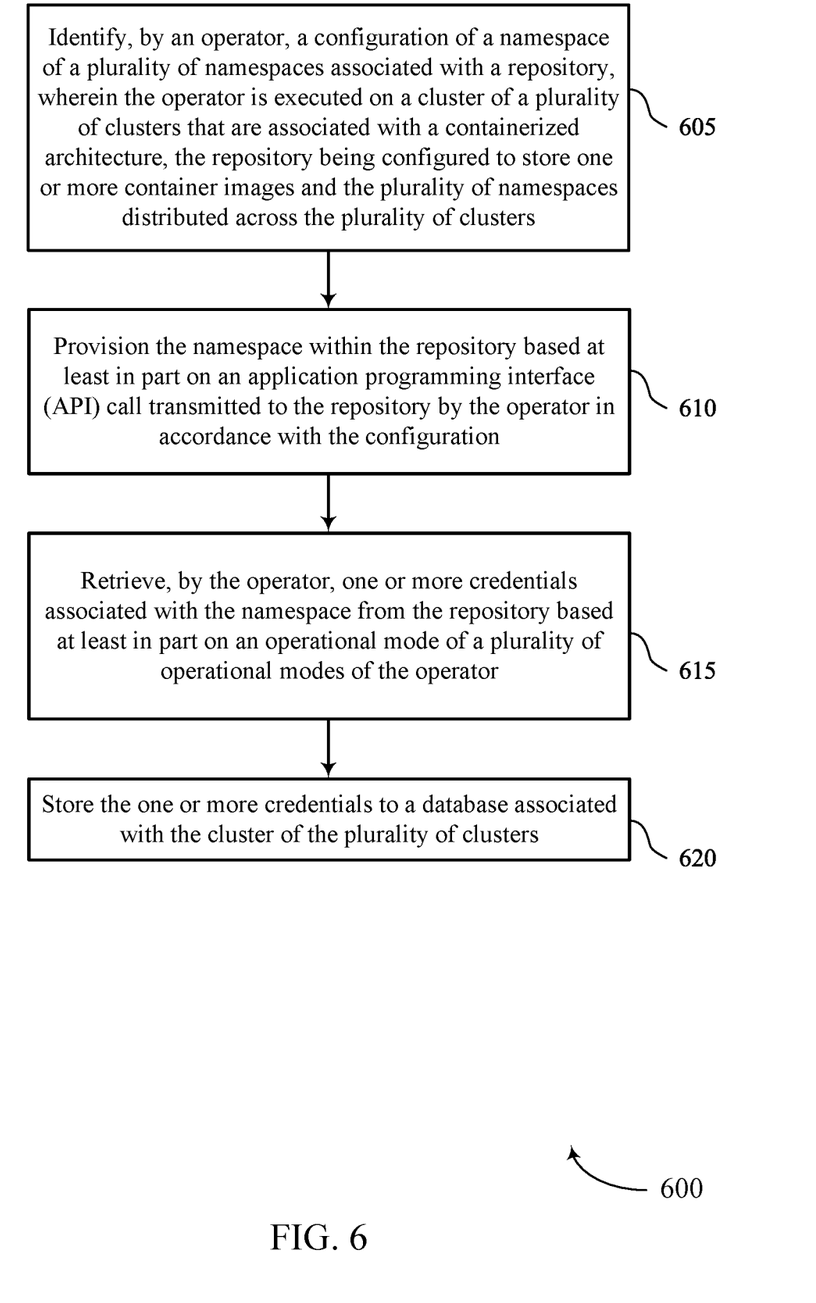
FIG. 6 shows a flowchart illustrating methods that support techniques for container registry credentials management in accordance with aspects of the present disclosure.

FIG. 6 shows a flowchart illustrating a method 600 that supports techniques for container registry credentials management in accordance with aspects of the present disclosure. The operations of the method 600 may be implemented by a namespace operator or its components as described herein. For example, the operations of the method 600 may be performed by a namespace operator as described with reference to FIGS. 1 through 5. In some examples, a namespace operator may execute a set of instructions to control the functional elements of the namespace operator to perform the described functions. Additionally, or alternatively, the namespace operator may perform aspects of the described functions using special-purpose hardware.

At 605, the method may include identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters. The operations of 605 may be performed in accordance with examples as disclosed herein.

At 610, the method may include provisioning the namespace within the registry based at least in part on an API call transmitted to the registry by the operator in accordance with the configuration. The operations of 610 may be performed in accordance with examples as disclosed herein.

At 615, the method may include retrieving, by the operator, one or more credentials associated with the namespace from the registry based at least in part on an operational mode of a plurality of operational modes of the operator. The operations of 615 may be performed in accordance with examples as disclosed herein.

At 620, the method may include storing the one or more credentials to a database associated with the cluster of the plurality of clusters. The operations of 620 may be performed in accordance with examples as disclosed herein.

In some examples, an apparatus as described herein may perform a method or methods, such as the method 600. The apparatus may include features, circuitry, logic, means, or instructions (e.g., a non-transitory computer-readable medium storing instructions executable by a processor) for identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters, provisioning the namespace within the registry based at least in part on an API call transmitted to the registry by the operator in accordance with the configuration, retrieving, by the operator, one or more credentials associated with the namespace from the registry based at least in part on an operational mode of a plurality of operational modes of the operator, and storing the one or more credentials to a database associated with the cluster of the plurality of clusters.

Some examples of the method 600 and the apparatus described herein may further include operations, features, means, or instructions for determining that the operational mode corresponds to an infrastructure mode and configuring, as part of provisioning the namespace, the one or more credentials to authorize the namespace to modify a container image of the one or more container images of the registry.

Some examples of the method 600 and the apparatus described herein may further include operations, features, means, or instructions for determining that the operational mode corresponds to an application mode and configuring, as part of provisioning the namespace, the one or more credentials to authorize the namespace to access a container image of the one or more container images of the registry.

Some examples of the method 600 and the apparatus described herein may further include operations, features, means, or instructions for determining, by the operator, that the namespace may have not been provisioned within the registry, wherein provisioning the namespace may be based at least in part on the determining.

Some examples of the method 600 and the apparatus described herein may further include operations, features, means, or instructions for detecting a change in the configuration, wherein identifying the configuration may be based at least in part on detecting the change.

In some examples of the method 600 and the apparatus described herein, the change in the configuration comprises a creation of the configuration, an update of the configuration, or a deletion of the configuration.

Some examples of the method 600 and the apparatus described herein may further include operations, features, means, or instructions for executing an initialization procedure of the operator, wherein identifying the configuration may be part of the initialization procedure.

In some examples of the method 600 and the apparatus described herein, provisioning the namespace may include operations, features, circuitry, logic, means, or instructions for provisioning one or more robot accounts corresponding to the namespace based at least in part on the configuration.

Some examples of the method 600 and the apparatus described herein may further include operations, features, means, or instructions for storing the configuration in a distributed key-value database associated with the plurality of clusters.

In some examples of the method 600 and the apparatus described herein, the configuration comprises an indication of one or more permissions for one or more users associated with the namespace and an indication of one or more accounts associated with the namespace.

Some examples of the method 600 and the apparatus described herein may further include operations, features, means, or instructions for determining that the one or more credentials do not match one or more second credentials associated with the namespace and stored within the database, wherein storing the one or more credentials may be based at least in part on the determining.

In some examples of the method 600 and the apparatus described herein, the configuration comprises a custom organization map associated with the namespace.

In some examples of the method 600 and the apparatus described herein, the operational mode corresponds to an environmental variable of the operator.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   identifying, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters;

provisioning the namespace of the plurality of namespaces within the registry based at least in part on an application programming interface (API) call transmitted to the registry by the operator in accordance with the configuration;

retrieving, by the operator, one or more credentials associated with the namespace of the plurality of namespaces from the registry based at least in part on an operational mode of a plurality of operational modes of the operator; and storing the one or more credentials to a database associated with the cluster of the plurality of clusters.

2. The method of claim 1, further comprising:
determining that the operational mode of the plurality of operational modes corresponds to an infrastructure mode; and
configuring, as part of provisioning the namespace of the plurality of namespaces, the one or more credentials to authorize the namespace of the plurality of namespaces to modify a container image of the one or more container images of the registry.

3. The method of claim 1, further comprising:
determining that the operational mode of the plurality of operational modes corresponds to an application mode; and
configuring, as part of provisioning the namespace of the plurality of namespaces, the one or more credentials to authorize the namespace of the plurality of namespaces to access a container image of the one or more container images of the registry.

4. The method of claim 1, further comprising:
determining, by the operator, that the namespace of the plurality of namespaces has not been provisioned within the registry, wherein provisioning the namespace of the plurality of namespaces is based at least in part on the determining.

5. The method of claim 1, further comprising:
detecting a change in the configuration, wherein identifying the configuration is based at least in part on detecting the change.

6. The method of claim 5, wherein the change in the configuration comprises a creation of the configuration, an update of the configuration, or a deletion of the configuration.

7. The method of claim 1, further comprising:
executing an initialization procedure of the operator, wherein identifying the configuration is part of the initialization procedure.

8. The method of claim 1, wherein provisioning the namespace of the plurality of namespaces comprises:
provisioning one or more robot accounts corresponding to the namespace of the plurality of namespaces based at least in part on the configuration.

9. The method of claim 1, further comprising:
storing the configuration in a distributed key-value database associated with the plurality of clusters.

10. The method of claim 1, wherein the configuration comprises an indication of one or more permissions for one or more users associated with the namespace of the plurality of namespaces and an indication of one or more accounts associated with the namespace of the plurality of namespaces.

11. The method of claim 1, further comprising:
determining that the one or more credentials do not match one or more second credentials associated with the namespace of the plurality of namespaces and stored within the database, wherein storing the one or more credentials is based at least in part on the determining.

12. The method of claim 1, wherein the configuration comprises a custom organization map associated with the namespace of the plurality of namespaces.

13. The method of claim 1, wherein the operational mode of the plurality of operational modes corresponds to an environmental variable of the operator.

14. A non-transitory computer-readable medium storing code, the code comprising instructions executable by one or more processors to:
identify, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters;
provision the namespace of the plurality of namespaces within the registry based at least in part on an application programming interface (API) call transmitted to the registry by the operator in accordance with the configuration;
retrieve, by the operator, one or more credentials associated with the namespace of the plurality of namespaces from the registry based at least in part on an operational mode of a plurality of operational modes of the operator; and
store the one or more credentials to a database associated with the cluster of the plurality of clusters.

15. The non-transitory computer-readable medium of claim 14, wherein the instructions are further executable by the one or more processors to:
determine that the operational mode of the plurality of operational modes corresponds to an infrastructure mode; and
configure, as part of provision the namespace of the plurality of namespaces, the one or more credentials to authorize the namespace of the plurality of namespaces to modify a container image of the one or more container images of the registry.

16. The non-transitory computer-readable medium of claim 14, wherein the instructions are further executable by the one or more processors to:
determine that the operational mode of the plurality of operational modes corresponds to an application mode; and
configure, as part of provision the namespace of the plurality of namespaces, the one or more credentials to authorize the namespace of the plurality of namespaces to access a container image of the one or more container images of the registry.

17. The non-transitory computer-readable medium of claim 14, wherein the instructions are further executable by the one or more processors to:
determine, by the operator, that the namespace of the plurality of namespaces has not been provisioned within the registry, wherein provisioning the namespace of the plurality of namespaces is based at least in part on the determining.

18. The non-transitory computer-readable medium of claim 14, wherein the instructions are further executable by the one or more processors to:

detect a change in the configuration, wherein identifying the configuration is based at least in part on detecting the change.

19. The non-transitory computer-readable medium of claim 18, wherein the change in the configuration comprises a creation of the configuration, an update of the configuration, or a deletion of the configuration.

20. An apparatus, comprising:
one or more memories; and
one or more processors coupled with the one or more memories and configured to cause the apparatus to:
identify, by an operator, a configuration of a namespace of a plurality of namespaces associated with a registry, wherein the operator is executed on a cluster of a plurality of clusters that are associated with a containerized architecture, the registry being configured to store one or more container images and the plurality of namespaces distributed across the plurality of clusters;
provision the namespace of the plurality of namespaces within the registry based at least in part on an application programming interface (API) call transmitted to the registry by the operator in accordance with the configuration;
retrieve, by the operator, one or more credentials associated with the namespace of the plurality of namespaces from the registry based at least in part on an operational mode of a plurality of operational modes of the operator; and
store the one or more credentials to a database associated with the cluster of the plurality of clusters.

* * * * *